United States Patent
Valadares et al.

(10) Patent No.: US 6,660,076 B2
(45) Date of Patent: Dec. 9, 2003

(54) HIGH PERFORMANCE KAOLIN PIGMENT, A PAPER COATING COLOR CONTAINING HIGH PERFORMANCE KAOLIN PIGMENT, AND A METHOD FOR MAKING HIGH PERFORMANCE KAOLIN PIGMENT

(75) Inventors: Maria Cristina Almeida Valadares, Belo Horizonte (BR); João Duarte Neto, Belo Horizonte (BR)

(73) Assignee: Companhia Val Do Rio Doce, Minas Gerais (BR)

( * ) Notice: Subject to any disclaimer, the term of this patent is extended or adjusted under 35 U.S.C. 154(b) by 0 days.

(21) Appl. No.: 10/162,136

(22) Filed: Jun. 4, 2002

(65) Prior Publication Data

US 2003/0172846 A1 Sep. 18, 2003

(30) Foreign Application Priority Data

Mar. 12, 2002 (BR) .............................. 0202268

(51) Int. Cl.$^7$ ................................. C04B 14/04
(52) U.S. Cl. ................... 106/486; 106/484; 106/487
(58) Field of Search ................... 106/484, 486, 106/487

(56) References Cited

U.S. PATENT DOCUMENTS 6,312,511 B1 * 11/2001 Bilimoria et al. ........... 106/486
6,402,826 B1 * 6/2002 Yuan et al. .................. 106/486

* cited by examiner

*Primary Examiner*—C. Melissa Koslow
*Assistant Examiner*—Shalie Manlove
(74) *Attorney, Agent, or Firm*—Katten Muchin Zavis Rosenman

(57) ABSTRACT

A high performance kaolin pigment, a paper coating color containing high performance kaolin pigment, and a method for making high performance kaolin pigment, the kaolin pigment being provided with improved optical and rheological properties attained by strict control of size and shape of the particles, as well as size and shape distribution of the particles. The kaolin pigment has ISO brightness characteristics higher than 88.5, a particle size distribution of at least 94% by mass lower than 2 μm and at most 25% by mass lower than 0.2 μm and a Hercules viscosity at 1,100 RPM lower than 18 dynes in slurries with a solid content of 70%–75% solids.

10 Claims, No Drawings

HIGH PERFORMANCE KAOLIN PIGMENT, A PAPER COATING COLOR CONTAINING HIGH PERFORMANCE KAOLIN PIGMENT, AND A METHOD FOR MAKING HIGH PERFORMANCE KAOLIN PIGMENT

DESCRIPTION OF THE INVENTION

The present application is related to a high performance kaolin pigment, a paper coating color containing high performance kaolin pigment, as well as the a method for making high performance kaolin pigment.

In a more specific way, the present invention is directed to kaolin products to be used in paper coating and a method for making same, specially kaolin pigments having improved optical and Theological characteristics, its uses and methods for making it.

As is known by those skilled in the art, kaolin is a rock made of clay minerals, the kaolinite being the predominant mineral. Kaolin can be used in a number of industrial applications in view of its characteristics such as chemical inertia in a wide pH range, white color, low abrasion, low electric conductivity and low thermal conductivity, having particles with suitable shape and size that provide, good coverage and good rheology, in addition to a low cost when compared to other similar materials.

However, kaolin seldom occurs in a pure form, being necessary the use of specific processing methods already well-known in the industry practice to remove the components known as deleterious. Some components provide an undesirable color to kaolin, such as iron and titanium impurities, still others provide abrasion, such as the presence of sand, while others can be deleterious to the rheology, such as the presence of clay minerals having morphology and crystalline structure different from that of kaolinite.

Another important aspect is that the kaolin pigment characteristics vary from deposit to deposit, and significant differences in its characteristics can occur even for a particular deposit. For example, in the deposits located at Rio Capim Basin, in the northern region of Brazil, two types of crude kaolin, herein called coarse kaolin and fine kaolin, can exist in the same deposit.

Frequently, a thin transition layer can be observed between the two types of kaolin. Coarse and fine kaolins have quite distinct characteristics in view of their different geologic origins.

Coarse kaolin has a narrow size distribution. mainly in the fine end of the size distribution curve, typically with at most 15% by mass lower than 0.2 $\mu$m in the degritted fraction. A second characteristic of coarse kaolin is the higher kaolinite crystallization degree. The crystallization degree can be quantified by the Hinckley index that evaluates how well the kaolinite crystalline structure is formed. Usually, coarse kaolin has a Hinckley Index higher than 0.6. Another characteristic of coarse kaolin from the Rio Capim region is its morphology that occurs as large individual plates. In the kaolin region of Georgia In the United States, coarse kaolin having similar size to that of the coarse kaolin or the Rio Capim region can be found as "books", that is, they have packed kaolinite plates. These kaolin "books" require a mechanical process, called delamination, to change the kaolinite "books" into individual particles. Once turned into individual particles, the kaolinite particles provide a good coverage to paper, improving the opacity of the coated paper. However, this mechanical process of making individual kaolinite particles damages the particles, making their edges irregular. The coarse kaolin particles of the Rio Capim region are provided with the preserved hexagonal shape which is characteristic of kaolinite. The preservation of the regular edges of kaolinite particles contributes to the better rheology of the pigment On the other hand, fine kaolin is provided with a large amount of fine with at least 30% by mass lower than 0.2 $\mu$m in the degritted fraction. Besides being small, the fine kaolin particles have a more spherical shape and a lower crystallization degree, with a Hinckley index lower than 0.5.

In some applications, the specifications required for the kaolin pigment are quite severe, as in the case of its use in paper. The kaolin pigments are very used to fill and coat paper products. The sheet of paper, when comprising only of cellulose fibers, has a quite irregular surface which is caused by free areas between the fibers. The kaolin pigment can be used in the paper industry as a filler to fill the free spaces between the fibers or as a coating to make the surface more regular. The coating provides the paper with a smoother surface that better accommodates the printing ink, thus resulting in a better visual appearance of the printed paper.

The specifications of the kaolin pigment to be used as a coating are quite more severe than when it is used as a filler. Properties such as opacity, brightness, paper gloss and print gloss, here briefly called optical properties, as well as the rheological properties, are of great importance when the pigment is applied as a coating.

With the advent of coating machines with an ever increasing speed, the rheology of the pigment tends to play quite an important role in the application stage. During the paper coating application, the kaolin pigment is submitted to high shear rates, thus requiring an optimum rheology of the kaolin slurry.

It is known that, for a same kaolin pigment, the higher the solid content, the higher the resulting viscosity. Kaolin pigments that have a low viscosity at a high shear rate and at high solid content are considered differentiated products, since they allow the coating machine to operate at a high speed, thus improving the productivity, as well as reducing the drying costs. If the kaolin pigment does not have a good rheology, the coating machine must be operated at lower speeds, which results in a loss of productivity, or the coating color must be diluted, resulting in higher cost in the drying step.

Pigments having improved optical properties are attractive to the paper industry in view of the Increasing demand for high quality coated papers. A kaolin pigment having a lower viscosity at high shear rates and at high solid content slurries and also imparting good optical properties to the coated paper, such as high brightness, high paper gloss and print gloss, without loosing opacity would be of great interest to the paper industry. The fine kaolin pigments commercially available provide high paper gloss and low viscosity at high shear rate and at nigh solid content, but with loss in print gloss and opacity. It is known that the presence of fines improves the viscosity at high shear rate as well as the paper gloss, but it is deleterious to the print gloss and opacity it is also known that particles with plate shape and narrow particle size distribution contribute to the opacity of the paper, but they are deleterious to the rheology of the pigment. However, by strictly controlling the size and shape of the particles, as well as the size and shape distribution of the particles, it is possible to obtain kaolin pigments having improved rheological and optical properties at the same time.

The prior art discloses a kaolin pigment consisting of coarse kaolin or a mixture containing coarse kaolin and fine kaolin having improved characteristics such as brightness, opacity, paper gloss and print gloss. The method for making this pigment comprises the removal of the fine fraction of the coarse kaolin, remaining only the coarse fraction, which fraction is characterized by possessing more spherical particles in the coarse end and plate shaped particles in the fine end, thus resulting in an average aspect ratio higher than 12. If only the coarse kaolin with the removed fines does not show a good fluidity, fine kaolin at a ratio of 0.1% to 30% by mass is added thereto. The coarse kaolin has a Hinckley index higher than 0.6, and the fine kaolin a Hinckley index lower than 0.5. The resultant pigment has at least 91% by mass lower than 2 $\mu$m and at most 30% by mass lower than 0.25 $\mu$m, and a Hercules viscosity higher than 250 RPM at 18 dynes for a solid content varying from 65% to 75%.

Usually the size of kaolin particles is measured by methods of sedimentation in an aqueous medium and is expressed in terms of equivalent spherical diameter, despite the fact that the kaolin particles are not spherical. The particle size lower than 2 $\mu$m is widely used in the paper industry as a control parameter, although under the process point of view it cannot determine the characteristics of the pigment. The equipment usually used to evaluate the size distribution of pigments is the "Sedigraph".

Direct measurements of the aspect ratio are usually carried out by means of an electronic microscope and comprise measuring the highest dimension and lowest dimension of each particle, which in the case of the kaolinite represents its thickness. The relationship between the highest and lowest dimension represents the measurement of the aspect ratio. Such measurements must be carried out in a great number of particles to assure a representative aspect ratio value.

The Hercules viscometer is the equipment widely used to evaluate the viscosity of a pigment at high shear rates. Pigments that show a high viscosity have their measurements reported in RPM at 18 dynes. As the viscosity decreases, the values in RPM increase, but in a general way, viscoities reported in RPM mean high viscosity values. Pigments that show low viscosity values are reported in the Hercules viscometer in dynes, usually at 1,100 RPM. As the viscosity decreases, the values in dyne also decrease. Thus, it is known that a pigment shows good rheological properties when Its Hercules viscosity values are reported in dyne and at high solid content.

Thus, one of the objects of the present invention is to provide a kaolin pigment for the paper coating with improved optical and rheological characteristics, which allow its application at high solid content.

Another object of the present invention is to provide a coating color for the paper containing a kaolin pigment made by mixing the fine fraction of the fine kaolin to the fine fraction of the coarse kaolin, resulting in a pigment with well defined particle size and shape characteristics, as well as particle size and shape distribution, thus assuring good rheological characteristics to the coating color and improved optical properties to the coated paper.

Still another object of the present invention is to provide a method for making a kaolin pigment having improved optical and rheological characteristics allowing its application at high solid content.

Thus, the present patent satisfies the need of the paper industry of having kaolin pigments with improved optical and rheological properties at the same time. The mixture comprising coarse kaolin and fine kaolin is a practice already known in the kaolin industry. The present invention discloses a process in which coarse and fine kaolin are mixed but only the fine fraction of coarse kaolin is used. By strict control of the size and shape of the particles, as well as the size and shape distribution of the particles, a kaolin pigment having improved optical and rheological characteristics at the same time can be obtained.

With the present invention, it can be seen that the shape distribution of the particles does not follow a regular distribution and, therefore, only an average value does not constitute a good parameter to characterize the pigment. The shape distribution evaluated through an electronic scanning microscope for the fine fraction of the coarse kaolin shows average aspect ratio values of at most 15 for the fine end and at most 30 for the coarse end. This particular shape distribution associated with a narrow particle size distribution result in a high paper gloss, high brightness and still maintaining a high print gloss and good opacity, characteristics not typical for kaolin with a fine particle size. Although the narrow particle size distribution and the high aspect ratio obtained in the coarse end favors the attainment of good print gloss and opacity, these features are deleterious to the attainment of low viscosity values at high shear rates. The present invention assures the attainment of low Hercules viscosity values by using a mixture of fine kaolin at low ratios in the order of 5% to 25% by mass, preferably 15%. This significant reduction in the viscosity values through the injection of small amounts of fine kaolin is attained due the use of only the fine fraction of the coarse kaolin. The use of the coarse fraction would not allow the attainment of the same viscosity reductions with a low participation of fine kaolin. This low use of fine kaolin is fundamental in order not to cause any deleterious effect on the other optical properties, such as opacity. The mixture of fine and coarse kaolin in these conditions allows the new pigment to achieve low Hercules viscosity values, in dynes, at solid content of 70% to 75%.

Those skilled in the processing of kaolin Know that pigments that disperse at high solid content, over 70% solids, and having a Hercules viscosity in dyne, show great advantages in view of the productivity gains in the paper coating machine and the reduction in drying costs. Thus, a change in the order of 1% in the solid content value of the pigment applied to the paper represents significant gains for the paper industry.

These and other objects and advantages of the present invention are attained by a high performance kaolin pigment, with a paper coating color containing high performance kaolin pigment, and with a method for making high performance kaolin pigment. The kaolin pigment has improved optical and rheological properties simultaneously attained by means of a strict control of the size and shape of the particles, as well as the size and shape distribution of the particles. Said kaolin pigment has ISO brightness characteristics higher than 88.5, a particle size distribution with at least 94% by mass lower than 2 $\mu$m and at most 25% by mass lower than 0.2 $\mu$m and a Hercules viscosity at 1,100 RPM lower than 18 dynes in slurries having a solid content of 70%–75% solids. The method for making the high performance pigment involves the steps of processing coarse kaolin comprising the dispersion, degritting for sand removal, centrifugation for discarding the coarse fraction and removal of the impurities through such conventional processes as magnetic separation, flotation and chemical leaching; said method also involving the steps of processing fine kaolin comprising the dispersion, degritting for sand removal, centrifugation for discarding the coarse fraction, and removal of the impurities through such conventional processes as magnetic separation, flocculation and chemical leaching; wherein in the centrifugation step for processing coarse kaolin a fine fraction is obtained, characterized by a narrow particle size distribution with at least 94% by mass lower than 2 μm and at most 18% by mass lower than 0.2 μm; while in the centrifugation step for processing fine kaolin a fine fraction is obtained, characterized by a particle size distribution with at least 90% by mass lower than 0.5 μm and at least 50% by mass lower than 0.2 μm.

The other objects of the present patent will be better understood by reading the following detailed description.

According to the present invention, the pigment is produced from the mixture of different types of crude kaolin, herein called coarse kaolin and fine kaolin, preferably originated from sedimentary deposits such as, for example, of the Rio Capim region in Brazil. Coarse kaolin has particle size and shape characteristics quite distinct from those of fine kaolin. Coarse kaolin differs from fine kaolin in view of a larger particle size, a greater presence of plate-shaped particles and a higher crystallization degree, usually with a Hinckley index higher than 0.6. The particle size distribution of the degritted fraction of the coarse kaolin presents from 55% to 75% by mass lower then 2 μm and at most 15% by mass lower than 0.2 μm. Fine kaolin differs in view of its smaller particle size, a greater presence of spherical particles and a lower crystallization degree, usually with a Hinckley index lower than 0.5. The particle size distribution of the degritted fraction of fine kaolin shows at least 75% by mass lower than 2 μm and at least 30% by mass lower than 0.2 μm. Examples of suitable coarse and fine kaolin particle size distribution for making the pigment of the present patent are given in Table 1.

TABLE 1

Particle size characteristics of degritted coarse and fine kaolin.

| Size (μm) | Coarse kaolin A | Coarse kaolin B | Fine kaolin C | Fine kaolin D |
|---|---|---|---|---|
| 10 | 91.4 | 93.6 | 94.1 | 95.1 |
| 5 | 81.6 | 87.2 | 89.0 | 91.8 |
| 2 | 59.4 | 73.5 | 79.9 | 90.8 |
| 1 | 40.3 | 61.2 | 71.7 | 88.1 |
| 0.5 | 19.0 | 43.1 | 61.3 | 82.2 |
| 0.2 | 6.5 | 12.7 | 32.1 | 53.7 |

Degritted fraction (% by mass lower than)

Crude coarse kaolin is dispersed in slurry containing from 40% to 60% solids with sodium polyacrylate or any other dispersing agent used to disperse kaolin, such as sodium hexametaphosphate and silicate. The disperse pulp is subjected to the sand removal step through sieves, sandboxes or hydrocyclones. The degritted slurry is then subjected to the coarse fraction removal through centrifuges in such a way to attain a narrow particle size distribution with at least 94% by mass lower than 2 μm and at most 18% by mass lower than 0.2 μm.

Another important characteristic of the fine fraction of coarse kaolin is the aspect ratio distribution: in the fine end of the particle size distribution curve the particles are more spherical with an average aspect ratio of at most 15, and in the coarse end the particles are plate shaped with an average aspect ratio of at most 30. The fine fraction of coarse kaolin is then submitted to the conventional impurities removal steps, such as high gradient magnetic separation, flotation and chemical leaching. Another embodiment of the present patent consists of carrying out the impurities removal steps, such as magnetic separation and flotation, before centrifugation.

Crude fine kaolin is dispersed in slurry containing from 40% to 60% solids with sodium polyacrylate or any other dispersing agent used to disperse kaolin, such as sodium hexametaphosphate and silicate. The dispersed pulp is then submitted to the sand removal step through sieves, sandboxes or hydrocyclones. The degritted slurry is then subjected to the coarse fraction removal step through centrifuges in such a way to attain a particle size distribution with at least 90% by mass lower than 0.5 μm and at least 50% by mass lower than 0.2 μm. The fine fraction of fine kaolin is then submitted to the conventional impurities removal steps, such as high gradient magnetic separation, selective flocculation and chemical leaching. Another embodiment of the present patent consists of carrying out the impurities removal steps, such as the magnetic separation and flocculation, before centrifugation. Usually, chemical leaching is the last impurities removal step and is carried out with the slurry in a coagulated state. After the chemical leaching, the slurry still in a coagulated state is submitted to a filtering step in a vacuum or press filter for removing the leached impurities. The resultant kaolin cake is redispersed with a dispersing agent, such as sodium polyacrylate. The redispersed coarse and fine kaolin slurries are mixed at a ratio of 5%–25% by mass of fine kaolin. Another embodiment of the present patent consists of making the mixture of coarse and fine kaolin, at a ratio of 5%–25% by mass of fine kaolin, after centrifugation. In this embodiment, the coarse and fine kaolin impurities removal steps are carried out together. The pigment mixture can be used both as a slurry or as powder product. To attain the desired solid content evaporators or spraying dryers are commonly used for the water removal.

The kaolin pigment obtained through this process has an ISO brightness higher than 88.5, that is, varying from 88.5 to 91.0; a particle size distribution with at least 94% by mass lower than 2 μm and at most 25% by mass lower than 0.2 μm; a Hercules viscosity at 1,100 RPM lower than 18 dynes in slurries having a solid content of 70%–75% solids.

A number of examples associated with the present invention will be given below. In a first example, coarse kaolin having the particle size characteristics shown in Table 2 is used. Coarse kaolin is dispersed at 50% solids with sodium polyacrylate dosage of 0.9 kg/t and soda ash for correcting the pH. The dispersed slurry is degritted in a 325 mesh sieve. The degritted slurry is centrifuged in a Bird centrifuge, obtaining fine and coarse fractions. The coarse fraction is discarded and the fine fraction shows the following characteristics: 97,2% by mass lower than 2 μm and 10,5% by mass lower than 0.2 μm; average aspect ratio values in the fine end of 7.6, and in the coarse end of 19.4. The fine fraction of coarse kaolin is submitted to a concentration step in a cryogenic magnetic separator Carpco and the non-magnetic product is bleached with sodium ditionite at 1 kg/t dosage, and then redispersed with sodium polyacrylate.

TABLE 2

Particle size characteristics of degritted coarse kaolin

| Size (μm) | Degritted coarse kaolin (% by mass lower than) |
|---|---|
| 10 | 91.5 |
| 5 | 81.8 |
| 2 | 61.5 |
| 1 | 41.3 |
| 0.5 | 19.5 |
| 0.2 | 4.2 |

The particle size characteristics of the fine kaolin used are given in Table 3. Fine kaolin is dispersed in 50% solids with sodium polyacrylate dosage of 5 kg/t dosage and soda ash for correcting the pH. The dispersed slurry is degritted in a 325 mesh sieve. The degritted slurry is centrifuged in a Bird centrifuge, thus obtaining a fine and coarse fractions. The coarse fraction is discarded and the fine fraction presents the following characteristics: 98,7% by mass lower than 2 μm and 62,6% by mass lower than 0.2 μm. The fine fraction is submitted to a concentration step in a cryogenic magnetic separator Carpco and the non-magnetic product is bleached with sodium ditionite at a 2 kg/t dosage, and then redispersed with sodium polyacrylate.

TABLE 3

Particle size characteristics of degritted fine kaolin

| Size (μm) | Degritted fine kaolin (% by mass lower than) |
|---|---|
| 10 | 95.7 |
| 5 | 92.0 |
| 2 | 85.9 |
| 1 | 82.9 |
| 0.5 | 78.1 |
| 0.2 | 53.5 |

The pigment described in this example is comprised of a mixture containing 15% by mass of redispersed fine kaolin with 85% by mass of redispersed coarse kaolin.

In the application examples that follow, the pigment of the present patent is compared to a high quality pigment used in the industry and herein called reference pigment, in offset applications. In table 4, the characteristics of the pigment described in this example and those of the reference pigment are given.

TABLE 4

Characteristics of the patent pigment and the reference pigment

| Size (μm) | Patent Pigment | Reference Pigment |
|---|---|---|
| | % by mass lower than | |
| 10 | 99.8 | 99.7 |
| 5 | 99.7 | 99.6 |
| 2 | 97.4 | 90.0 |
| 1 | 82.9 | 70.9 |
| 0.5 | 50.6 | 44.7 |
| 0.2 | 18.3 | 14.2 |
| Brightness | | |
| % ISO | 89.2 | 89.2 |
| Viscosity @ 71% solids | | |
| Brookfield @ 20 rpm | 280 cps | 520 cps |
| Hercules | 3.5 dynes @ 1100 rpm | 725 rpm @ 18 dynes |

EXAMPLE 1

Comparison between the patent pigment and the reference pigment in paper coatings obtained through an alkaline route.

A typical paper industry formulation is used, where kaolins are mixed to calcium carbonate at a 50/50 ratio. The coating is carried out in a pilot plant and the rheological behavior of all the coating color is good. The results are given in Table 5, a formulation of 50% kaolin pigment/5% calcium carbonate.

TABLE 5

Properties of the coated paper. Formulation of 50% kaolin pigment/50% calcium carbonate

| Characteristics | Patent Pigment | Reference Pigment |
|---|---|---|
| Brightness ISO (%) | 82.1 | 82.0 |
| Paper gloss (%) | 62.8 | 60.2 |
| Print gloss (%) | 85.5 | 82.0 |
| Opacity (%) | 90.7 | 90.6 |
| Smoothness (PPS) | 1.30 | 1.35 |

The values are attained at a paper coating weight of 12 g/m$^2$, and it can be seen that the brightness, paper gloss, print gloss and opacity were higher than the values attained by the reference pigment. The smoothness is also higher in the patent pigment (lower PPS).

EXAMPLE 2

Comparison between the patent pigment and the reference pigment, in paper applications obtained through an acid route. In this example, the formulations only use kaolin as the pigment. Just like the previous example, the coatings were obtained in a pilot plant and the rheological behavior of the coating color is good. The results given in Table 6 shows again that the brightness, paper gloss, print gloss, and opacity obtained in the patent pigment are higher than the values attained by the reference pigment The smoothness is at the same level.

TABLE 6

Properties of coated paper. Formulation of 100% kaolin pigment.

| Characteristics | Patent pigment | Reference Pigment |
|---|---|---|
| Brightness ISO (%) | 76.8 | 76.7 |
| Paper gloss (%) | 63.3 | 58.2 |
| Print gloss (%) | 80.8 | 75.7 |
| Opacity (%) | 96.2 | 96.1 |
| Smoothness (PPS) | 1.30 | 1.30 |

What is claimed is:

1. A high performance kaolin pigment characterized by having improved optical and rheological properties, comprising a mixture of crude coarse kaolin and crude fine kaolin having distinct well-defined shape and particle size characteristics, said crude coarse kaolin being composed of large single plate-shaped particles with a high crystallization degree, with a Hinckley index higher than 0.6, with a size distribution in the degritted fraction of 55% to 75% by mass lower than 2 μm, and at most 15% by mass lower than 0.2 μm.

2. The high performance kaolin pigment in accordance with claim 1, characterized by being comprised of a mixture of coarse kaolin and fine kaolin, said fine kaolin being composed of small spherical particles with a low crystallization degree, usually with a Hinckley index lower than 0.5, and with a size distribution in the degritted fraction of at least 75% by mass lower than 2 μm and at least 30% by mass lower than 0.2 μm.

3. A paper coating color containing high performance kaolin pigment, characterized by having an ISO brightness higher than 88.5 and lower than 91.0; a particle size distribution with at least 94% by mass lower than 2 μm and 25% by mass lower than 0.2 μm, and a Hercules viscosity at 1,100 RPM lower than 18 dynes in slurries having a solid content of 70%–75% solids.

4. A method for making high performance kaolin pigment having improved optical and rheological properties attained by mixing coarse kaolin with fine kaolin, characterized in that the processing of fine kaolin comprises the steps of: a) dispersion of a crude fine kaolin with a particle size distribution in the degritted fraction with at least 75% by mass lower than 2 $\mu$m and at least 30% by mass lower than 0.2 $\mu$m, in a slurry containing 40%–60% solids by using a dispersing agent; b) removal of the sand contained in the fraction above 325 mesh through sieves, sandboxes or hydrocyclones; c) centrifugation of the fine kaolin for removing the coarse fraction, resulting in a fine fraction comprising at least 90% by mass lower than 0.5 $\mu$m and at least 50% by mass lower than 0.2 $\mu$m; d) removal of the impurities of the fine fraction of fine kaolin, through flocculation, magnetic separation and/or chemical leaching, wherein said flocculation and/or magnetic separation steps can be carried out before or after the centrifugation.

5. The method of claim 4 further characterized in that the processing of coarse kaolin comprises the steps of: a) dispersion of crude coarse kaolin having a particle size distribution in the degritted fraction of 55% to 75% by mass lower than 2 $\mu$m and at most 15% by mass lower than 0.2 $\mu$m, in a slurry containing 40% to 60% solids by using a dispersing agent; b) removal of the sand contained in the fraction above 325 mesh through sieves, sandboxes or hydrocyclones; c) centrifugation of the degritted kaolin for removing the coarse fraction, resulting in a fine fraction having a particle size distribution with at least 94% by mass lower than 2 $\mu$m and at most 18% by mass lower than 0.2 $\mu$m and an average aspect ratio of at most 15 in the fine end and of at most 30 in the coarse end; d) removal of the impurities of the fine fraction of coarse kaolin, through flotation, magnetic separation and/or chemical leaching, wherein said magnetic separation and flotation steps can be carried out before or after the centrifugation.

6. The high performance kaolin pigment in accordance with claim 1 where, prior to mixing with the crude fine kaolin, the crude coarse kaolin is divided into a coarse fraction and a fine fraction, and only the fine fraction of the coarse kaolin is mixed with the crude fine kaolin.

7. The high performance kaolin pigment in accordance with claim 6 where, prior to mixing with the crude coarse kaolin, the crude fine kaolin is divided into a coarse fraction and a fine fraction, and only the fine fraction of the crude fine kaolin is mixed with the crude coarse kaolin.

8. The high performance kaolin pigment in accordance with claim 6, where the mass of crude fine kaolin in the mixture comprises from about 5% to about 25% of the mass of the mixture.

9. The high performance kaolin pigment in accordance with claim 1, having an ISO brightness of from about 88.5 to about 91.0, a particle size distribution with at least 94% by mass lower than 2 $\mu$m and at most 25% by mass lower than 0.2 $\mu$m and a Hercules viscosity at 1,100 RPM lower than 18 dynes in slurries having a solid content of 70% to 75% solids.

10. A paper coating color formulation containing dispersed high performance kaolin pigment in accordance with claim 3, having an ISO brightness of from about 88.5 to about 91.0, a particle size distribution with at least 94% by mass lower than 2 $\mu$m and at most 25% by mass lower than 0.2 $\mu$m and a Hercules viscosity at 1,100 RPM lower than 18 dynes in slurries having a solid content of 70% to 75% solids.

* * * * *